United States Patent [19]
Rostrop-Nielsen et al.

[11] Patent Number: 5,932,141
[45] Date of Patent: Aug. 3, 1999

[54] SYNTHESIS GAS PRODUCTION BY STEAM REFORMING USING CATALYZED HARDWARE

[75] Inventors: Jens Rostrop-Nielsen, Virum; Peter Seier Christensen, Copenhagen; Viggo Lucassen Hansen, Brønshøj, all of Denmark

[73] Assignee: Haldor Topsoe A/S, Lyngby, Denmark

[21] Appl. No.: 09/010,529

[22] Filed: Jan. 22, 1998

Related U.S. Application Data

[60] Provisional application No. 60/035,396, Jan. 22, 1997.

[51] Int. Cl.$^6$ .............................. C07C 1/02; C01B 3/24; C01B 31/18; B01J 8/04
[52] U.S. Cl. .................. 252/373; 423/650; 423/418.2; 422/194; 422/197; 422/239
[58] Field of Search ........................... 252/373; 423/650, 423/418.2; 422/194, 197, 239

[56] References Cited

U.S. PATENT DOCUMENTS

| | | |
|---|---|---|
| 4,618,451 | 10/1986 | Gent ........................................ 252/373 |
| 4,830,834 | 5/1989 | Stahl et al. .............................. 422/204 |
| 4,844,837 | 7/1989 | Heck ........................................ 252/373 |
| 5,004,592 | 4/1991 | Pinto ....................................... 252/373 |
| 5,030,661 | 7/1991 | Lywood ................................... 252/373 |
| 5,429,809 | 7/1995 | Stahl et al. .............................. 422/202 |
| 5,486,313 | 1/1996 | De Jong et al. ......................... 252/373 |
| 5,567,397 | 10/1996 | Le Gal et al. ........................... 422/192 |

Primary Examiner—Gary P. Straub
Assistant Examiner—Melanie C. Wong
Attorney, Agent, or Firm—Ostrolenk, Faber, Gerb & Soffen, LLP

[57] ABSTRACT

The process of this invention prepares a hydrogen and carbon monoxide rich gas stream by passing a hydrocarbon feedstock mixed with steam to a tubular reaction with a thin layer of film of a steam reforming catalyst supported on the inner walls thereof; passing the effluent from the tubular reaction to a fixed bed steam reforming catalyst; and withdrawing from the fixed bed a hydrogen and carbon dioxide rich product gas, said tubular reactors being heated burning of fuel. Optionally, the feed to the tubular reactor herein designated the second tubular reactor, may be the effluent from a similar tubular reactor, herein designated the first tubular reactor in heat conducting relationship with hot flue gas from the second reactor.

6 Claims, 3 Drawing Sheets

SYNTHESIS GAS PRODUCTION BY STEAM REFORMING USING CATALYZED HARDWARE

This application claims the benefit of U.S. Provisional Application Serial No. 60/035,396, filed Jan. 22, 1997.

BACKGROUND OF THE INVENTION

Synthesis gas is produced from hydrocarbons by steam reforming by the reactions (1)–(3):

$$C_nH_m + n\ H_2O \rightarrow n\ CO + (n+m/2)\ H_2\ (\Delta H°/298 < 0) \quad (1)$$

$$CO + H_2O \leftrightharpoons CO_2 + H_2\ (-\Delta H°/298 = 41\ kJ/mol) \quad (2)$$

$$CH_4 + H_2O \leftrightharpoons CO + 3\ H_2\ (-\Delta H°/298 = 0.206\ kJ/mol) \quad (3)$$

State of the art steam reforming technology makes use of reforming catalyst in the form of pellets of various sizes and shapes. The catalyst pellets are placed in fixed bed reactors (reformer tubes). The reforming reaction is endothermic. The necessary heat for the reaction is supplied from the environment outside of the tubes usually by a combination of radiation and convection to the outer side of the reformer tube. The heat is transferred to the inner side of the tube by heat conduction through the tube wall, and is transferred from the gas phase to the catalyst pellet by convection. The catalyst temperature can be more than 100° C. lower than the inner tube wall temperature at the same axial position of the reformer tube. Below this is called conventional reforming.

SUMMARY OF THE INVENTION

This invention provides more efficient heat transport with the use of catalyzed hardware. The term catalyzed hardware is used for a catalyst system where a layer of catalyst is fixed on a surface of another material, eg. a metal. The other material serves as the supporting structure giving strength to the system. This enables to design catalyst shapes which would not have sufficient mechanical strength in itself. The system described herein consists of tubes on which a thin film or layer of reforming catalyst is place on the inner wall. The heat transport to the catalyst occurs by conduction from the inner tube wall. This is a much more efficient transport mechanism than the transport by convection via the gas phase. The result is that the temperatures of the inner tube wall and the catalyst are almost identical (the difference below 5° C.). Furthermore, the tube thickness can be reduced, see below, which makes the temperature difference between the inner and outer side of the reformer tube smaller. It is hence possible to have both a higher catalyst temperature and a lower tube temperature, all other conditions being the same when replacing the conventional reformer tubes with catalyzed hardware tubes. A low outer tube wall temperature is desirable since it prolongs the lifetime of the tube. A high catalyst temperature is advantageous since the reaction rate increases with temperature and since the equilibrium of reaction (3) is shifted to the right hand side resulting in a better utilization of the feed.

More specifically, the process of this invention prepares a hydrogen and carbon monoxide rich gas stream by passing a hydrocarbon feedstock mixed with steam to a tubular reaction with a thin layer of film of a steam reforming catalyst supported on the inner walls thereof; passing the effluent from the tubular reactor to a fixed bed steam reforming catalyst; and withdrawing from the fixed bed a hydrogen and carbon dioxide rich product gas, said tubular reactors being heated by burning of fuel.

Optionally, the feed to the tubular reactor herein designated the second tubular reactor, may be the effluent from a similar tubular reactor, herein designated the first tubular reactor, in heat conducting relationship with hot flue gas from the second reactor.

The fixed bed is preferably operated at adiabatic conditions and may be arranged within the second tubular reactor. The catalyst preferably comprises nickel and/or ruthenium.

The pressure drop in the catalyzed reformer tube is much lower than the conventional case for the same tube diameter. This enables the use of reactor tubes with a smaller diameter and still maintaining an acceptable pressure drop. Smaller tube diameter results in an increased tube lifetime, tolerates higher temperatures and reduces the tube material consumption.

Finally the catalyst amount is reduced when using catalyzed hardware reformer tubes compared to the conventional case.

DESCRIPTION OF PREFERRED EMBODIMENT

Figure 1:
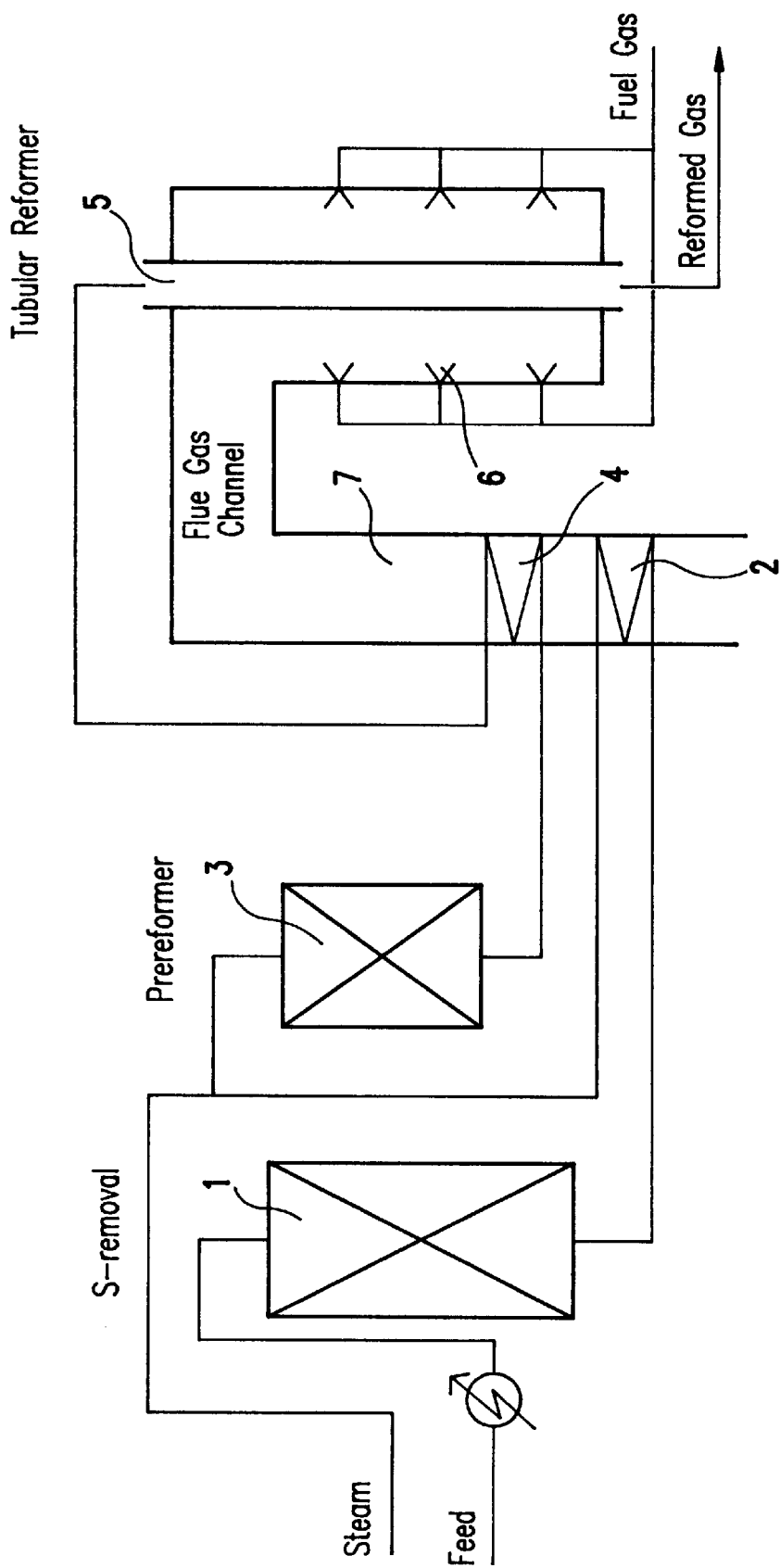
FIG. 1 diagrammatically illustrates the front end of a plant producing syngas.

As shown in FIG. 1, which illustrates the front-end of a plant producing syngas, the feed is preheated, desulphurized in vessel 1, mixed with process stream, and further heated in coil 2 before entering an adiabatic prereformer 3. The effluent stream is further heated in coil 4 and sent to the tubular reformer 5, which is heated by burner 6 where conversion of methane to hydrogen, carbon monoxide, and carbon dioxide occurs. Coils 2 and 4 are positioned inside flue gas channel 7. The processing of effluent gas downstream from the tubular reformer depends on the use of the product.

Catalyzed hardware can be used in two of the units shown in FIG. 1, namely:

1. In the preheater coil for heating the prereformer effluent gas before entering the tubular reformer.

2. In the tubular reformer.

In Table 1, below, is presented the results obtained for the plant in FIG. 1 when catalyzed hardware is used in the two units. The catalyst used for the catalyzed hardware is the R-67R nickel steam reforming catalyst available from Haldor Topsoe A/S. The results are compared with the conventional case.

The purpose of the preheater coils 2 and 4 is to use the heat content in the flue gas for preheating of the process gas before it enters the tubular reformer. The flue gas is used for preheating of process gas and for preheating of the combustion air for the tubular reformer (not shown in FIG. 1). However, the heat content of the flue gas is larger than what can be used for these purposes and the remaining heat is used for steam production. It will be advantageous if a larger amount of the heat content in the flue gas can be transferred to the process gas. This will reduce the necessary amount of fuel in the tubular reformer, and it will reduce the size of the reformer since a smaller amount of heat is to be transferred in the unit.

The conventional preheater is limited by the risk of carbon formation by decomposition of methane. This sets an upper limit for the tube wall temperature which can be accepted. Fixing a layer of catalyzed hardware on the inner tube wall of the preheater coil results in a decrease of both the tube wall temperature and the process gas temperature. This enables the transfer of a higher duty in the coil without having a higher tube temperature.

Figure 2:
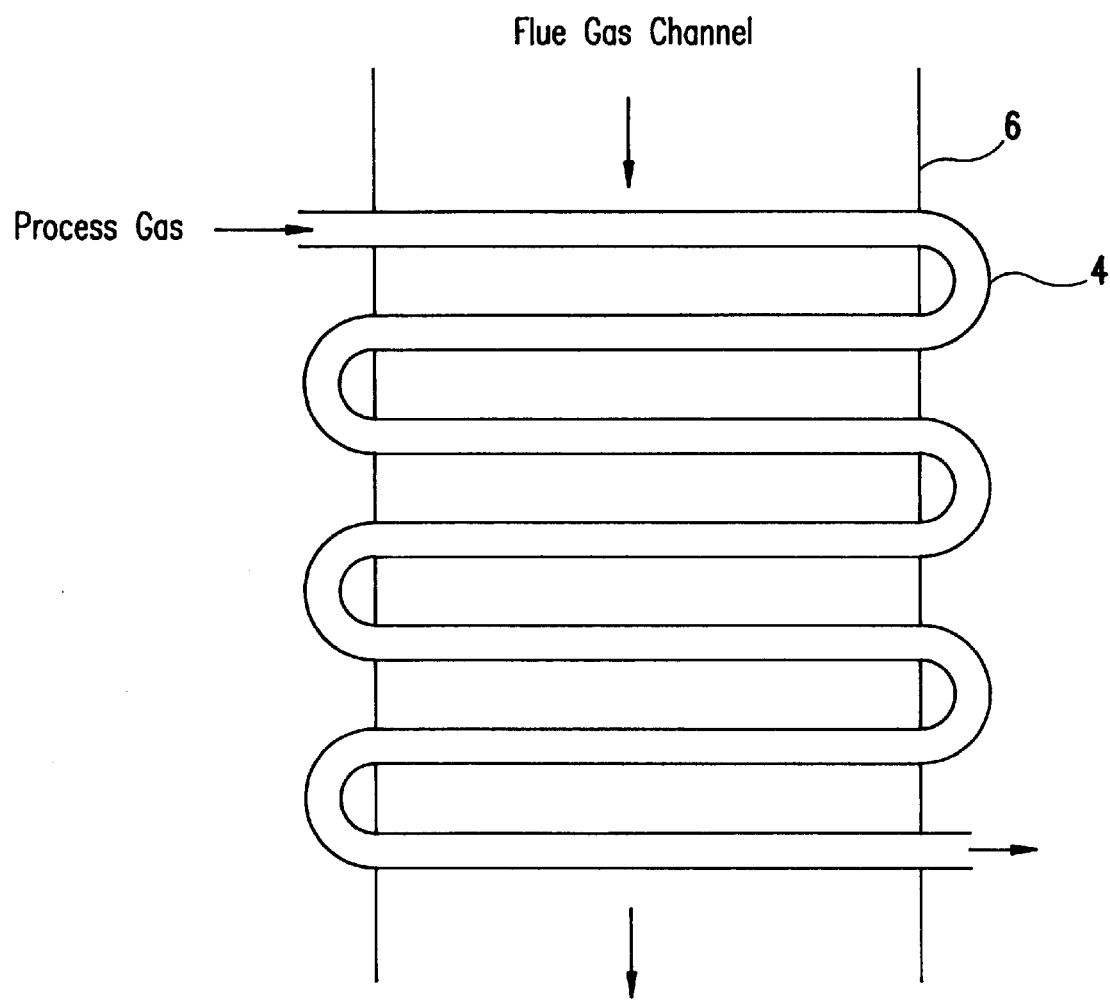
FIG. 2 illustrates the positioning of one of the tubes of a preheater coil.

The preheater coil used in the calculation consists of 8 tubes in which the process gas flows inside the tubes. The flue gas flows on the outer side through flue gas channel 7. The flow pattern is cross flow/co-current. FIG. 2 shows the layout for one tube, the components being numbered as in FIG. 1. The two cases with and without catalyzed hardware is summarized in Table 1. It appears that the transferred duty is 49% higher in the catalyzed hardware case compared to the conventional case. The catalyst layer thickness in the catalyst hardware case is 0.1 mm.

TABLE 1

|  | Conventional case | Catalyzed hardware case |
|---|---|---|
| Number of tubes | 8 | 8 |
| Tube ID/OD | $(168.3/131.8)^1$ 168.3/139.8 | $(168.3/131.8)^1$ |
| Total effective$^2$ tube length | 51.6 m | 76.2 m |
| Flue gas in/out temperature | 1057° C./964° C. | 1057° C./912° C. |
| Process gas in/out temperature | 512° C./650° C. | 512° C./631° C. |
| Methane conversion | 0% | 8.7% |
| Duty | $9.69 \pm 10^6$ kcal/h | $1.44 \pm 10^7$ kcal/h |
| Catalyst amount | 0 t | 0.068 t |

$^1$The number in the bracket is the value for the first 17.2 m of the tube.
$^2$The effective tube length is the length of the tube inside the flue gas channel.

The conventional tubular reformer consists of a number of tubes which filled with catalyst pellets. The process gas flows inside the tubes. The tubes are placed in a furnace which is heated by combustion of a fuel.

In the catalyzed hardware case the catalyst pellet filled tubes are replaced with a number of tubes with a layer of catalyzed hardware on the inner tube wall. The catalyst layer thickness is 0.25 mm. An additional adiabatic reforming fixed bed reactor 8 (FIG. 3) is placed downstream from the tubular reactor since the conversion of methane in the catalyzed hardware tubular reformer is inferior to the conventional case. This reactor is called post reformer. The catalyst used in the post reformer is the RKS-2 nickel steam reforming catalyst available from Haldor Topsoe A/S.

The two cases are summarized below in Table 2. It appears that the catalyst consumption is decreased by a factor of 11.5, and that the material consumption for the tubes in the tubular reformer is decreased 24% in the catalyzed hardware case compared to the conventional case.

TABLE 2

|  | Conventional case | Catalyzed hardware reformer | Catalyzed hardware case + post reformer |
|---|---|---|---|
| Number of tubes | 276 | 187 |  |
| Tube ID/OD | 108.1/136 mm | 35/55 mm |  |
| Tube length | 13 m | 55 m |  |
| Catalyst consumption | 31.0 t | 0.63 t | 2.70 t |
| Tube material consumption for tubular reformer | 153.6 t | 116.0 t |  |
| Methane conversion | 89.0% | 80.7% | 90.2% |

Figure 3:
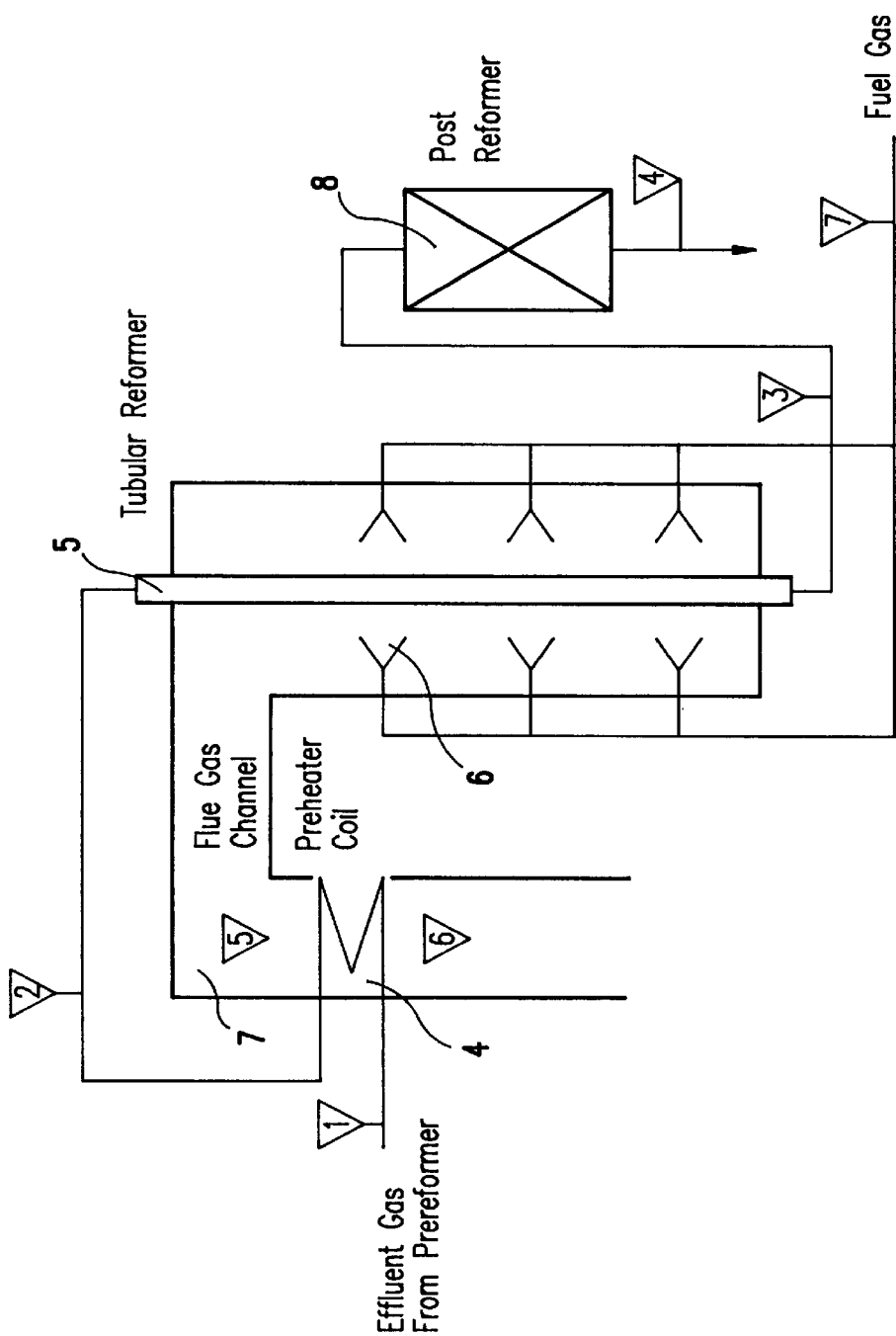
FIG. 3 is a diagrammatic representation of a plant for carrying out the process of this invention.

A diagram of the plant is shown in FIG. 3, the components being numbered as in FIG. 1. The numbers in the triangles refer to Table 3 below in which the overall figures for the plant are compared. The fuel consumption is decreased by 7.4% in the catalyzed hardware case compared to the conventional case.

TABLE 3

| Position |  | Conventional Case | Catalyzed Hardware Case |
|---|---|---|---|
| 1 | T (° C.) | 512 | 512 |
|  | P (kg/cm$^2$ g) | 28.5 | 28.9 |
|  | Total dry flow (Nm$^3$/h) | 57851 | 57851 |
|  | Total flow (Nm$^3$/h) | 143168 | 143168 |
|  | Composition (dry mode %) | 23.78 | 23.78 |
|  | $H_1$ | 0.74 | 0.74 |
|  | CO | 21.14 | 21.14 |
|  | $CO_2$ | 54.34 | 54.34 |
|  | $CH_4$ |  |  |
| 2 | T (° C.) | 650 | 631 |
|  | P (kg/cm$^2$ g) | 27.5 | 27.4 |
|  | Total dry flow (Nm$^3$/h) | 57851 | 67397 |
|  | Total flow (Nm$^3$/h) | 143108 | 148720 |
|  | Composition (dry mode %) | 23.78 | 34.58 |
|  | $H_1$ | 0.74 | 2.67 |
|  | CO | 21.14 | 20.16 |
|  | $CO_2$ | 56/34 | 42.59 |
|  | $CH_4$ |  |  |
| 3 | T (° C.) | No post reformer in this case | 1015 |
|  | P (kg/cm$^2$ g) |  | 26.0 |
|  | Total dry flow (Nm$^3$/h) |  | 132653 |
|  | Total flow (Nm$^3$/h) |  | 194106 |
|  | Composition (dry mode %) |  | 66.76 |
|  | $H_1$ |  | 20.42 |
|  | CO |  | 8.24 |
|  | $CO_2$ |  | 4.57 |
|  | CM |  |  |
| 4 | T (° C.) |  | 930 |
|  | P (kg/cm$^2$ g) |  | 74.4 |
|  | Total dry flow Nm$^3$h |  | 142580 |
|  | Total flow Nm$^3$/h) |  | 200003 |
|  | Composition (dry mode %) |  | 68.08 |
|  | $H_1$ |  | 20.35 |
|  | CO |  | 8.40 |
|  | $CO_2$ |  | 2.17 |
|  | $CM_4$ |  |  |
| 5 | T (° C.) | 1057 | 1057 |
|  | Total flow | 244672 | 234677 |
| 6 | T (° C.) | 964 | 912 |

TABLE 3-continued

| Position | | Conventional Case | Catalyzed Hardware Case |
|---|---|---|---|
| 7 | Total flow Nm$^3$/h) | 9524 | 8820 |

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Process for the preparation of a hydrogen and carbon monoxide rich gas by steam reforming of a hydrocarbon feedstock in presence of a steam reforming catalyst supported as thin film on the inner wall of a tubular reactor, comprising the steps of
    (a) passing a process gas of hydrocarbon feedstock and steam through a first tubular reactor with a thin film of steam reforming catalyst supported on the inner walls of the reactor in heat conducting relationship with hot flue gas from a subsequent second tubular steam reforming reactor;
    (b) passing the effluent from the first tubular reactor to the subsequent second tubular reactor being provided on its inner wall with a thin film of the steam reforming catalyst and being heated by burning of fuel proximate to its outer walls, thereby obtaining a partially steam reformed gas effluent and the hot flue gas;
    (c) passing said effluent from the second reactor to a fixed bed steam reforming catalyst; and
    (d) withdrawing from the fixed bed a product gas of the hydrogen and carbon monoxide rich gas.

2. Process of claim 1, wherein the fixed bed steam reforming catalyst is operated at adiabatic condition.

3. Process of claim 1, wherein the steam reforming catalyst comprises nickel and/or ruthenium.

4. Process for the preparation of a hydrogen and carbon monoxide rich gas by steam reforming of a hydrocarbon feedstock in presence of a steam reforming catalyst supported as thin film on the inner wall of a tubular reactor, comprising the steps of
    (a) passing a process gas of hydrocarbon feedstock and steam to a tubular reactor being provided on its inner walls with a thin film of the steam reforming catalyst and being heated by burning of fuel proximate to its outer walls, thereby obtaining a partially steam reformed gas effluent and the hot flue gas;
    (b) passing said effluent from the tubular reactor to a fixed bed steam reforming catalyst; and
    (c) withdrawing from the fixed bed a product gas of the hydrogen and carbon monoxide rich gas.

5. Process of claim 4, wherein the fixed bed steam reforming catalyst is operated at adiabatic condition.

6. Process of claim 4, wherein the steam reforming catalyst comprises nickel and/or ruthenium.

* * * * *